Dec. 30, 1952      E. C. WEISKOPF      2,623,301
DRIER FOR MICROSCOPE SLIDES
Filed Aug. 18, 1949      2 SHEETS—SHEET 1
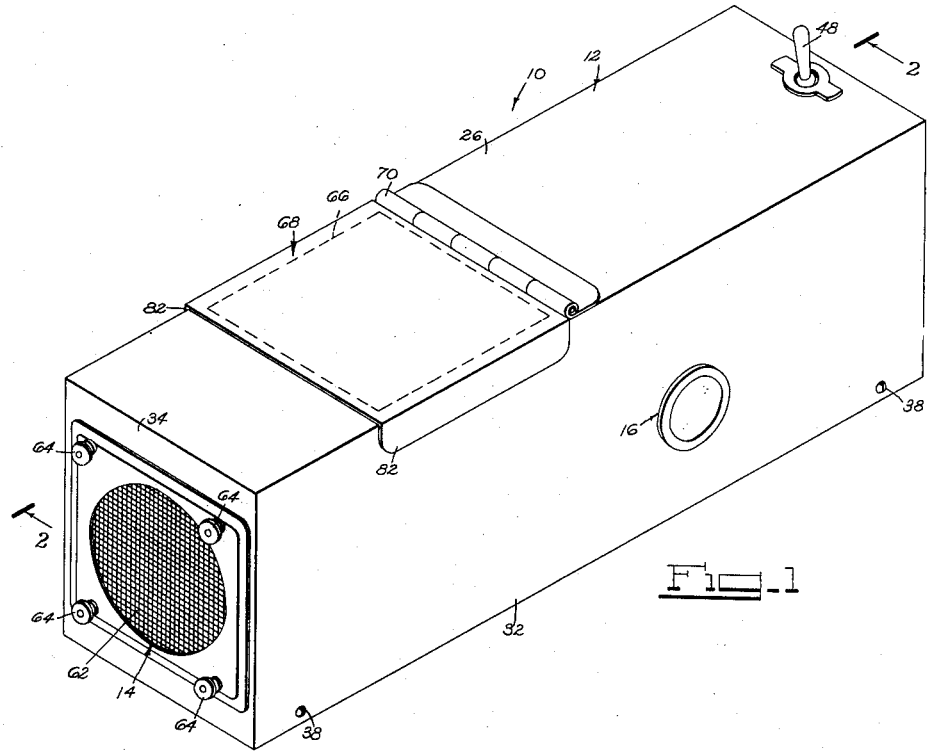
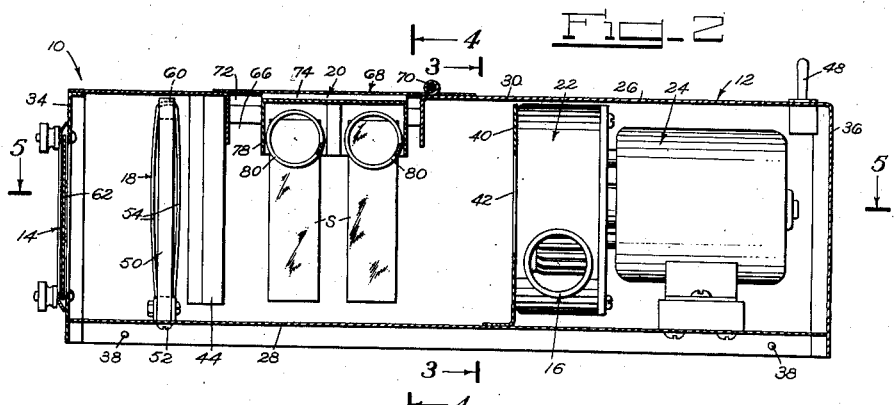
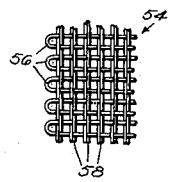
INVENTOR.
EDWIN C. WEISKOPF
BY
ATTORNEYS Dec. 30, 1952      E. C. WEISKOPF      2,623,301
DRIER FOR MICROSCOPE SLIDES Filed Aug. 18, 1949      2 SHEETS—SHEET 2

INVENTOR.
EDWIN C. WEISKOPF

BY Edwin Levisohn +
Harry Cole
ATTORNEYS

Patented Dec. 30, 1952

2,623,301

UNITED STATES PATENT OFFICE 2,623,301

DRIER FOR MICROSCOPE SLIDES

Edwin C. Weiskopf, New York, N. Y., assignor to Technicon International, Ltd., New York, N. Y., a corporation of New York Application August 18, 1949, Serial No. 110,977

6 Claims. (Cl. 34—148)

The present invention relates to dryers for microscope slides.

The term "slide" as ordinarily used herein and as used by the pathologist and others includes the glass slide proper together with the specimens thereon. In the preparation of histological tissue specimens for microscopic examination, the usual method of placing a tissue section on the glass slide involves floating a thin tissue section in a water bath and immersing the glass slide under the section so as to position the latter on the slide. The moisture thus applied to the section on the slides should be removed, and this was heretofore ordinarily accomplished by placing the slides in a drying oven.

The primary object of the present invention is the provision of improved means for drying microscope slides. More specifically, the purpose of the present invention is to provide a slide dryer which is of simple construction and which is well adapted to facilitate and expedite the drying of microscope slides so as to eliminate unnecessary delays in the further processing of the slides for microscopic examination.

The above and other objects, features and advantages of this invention will be fully understood from the following description considered in connection with the accompanying illustrative drawings.

In the drawings:

Fig. 1 is a perspective view of a slide dryer embodying the present invention;

Fig. 2 is a sectional view on the line 2—2 of Fig. 1;

Fig. 6 is a view in elevation of part of the heater element of the slide dryer.

Figure 4:
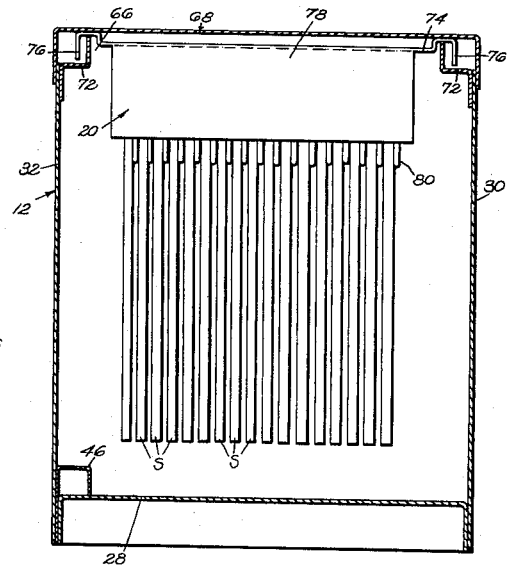
Fig. 4 is a sectional view on the line 4—4 of Fig. 2.

Referring now to the drawings in detail, the slide dryer 10 embodying the present invention comprises a casing 12 having an air inlet 14, an air outlet 16, an air heater 18, a slide holder 20 and an air pump 22 operated by a motor 24. The microscopic slides S carried by the holder 20, which, as shown in Fig. 2, is positioned within the casing 12 in advance of the air heater 18, in the path of the air flow from the inlet 14 to the outlet 16, and are thus subjected to the drying action of the heated air. As shown by Fig. 4 the microscopic slides S are disposed in spaced face-to-face relation and with the faces of the slides parallel to the direction of the flow of air so that each of a comparatively large number of slides is exposed to the air flow whereby all of the slides are dried uniformly and in a comparatively short time compared with the old method of drying slides in an oven.

Figure 3:
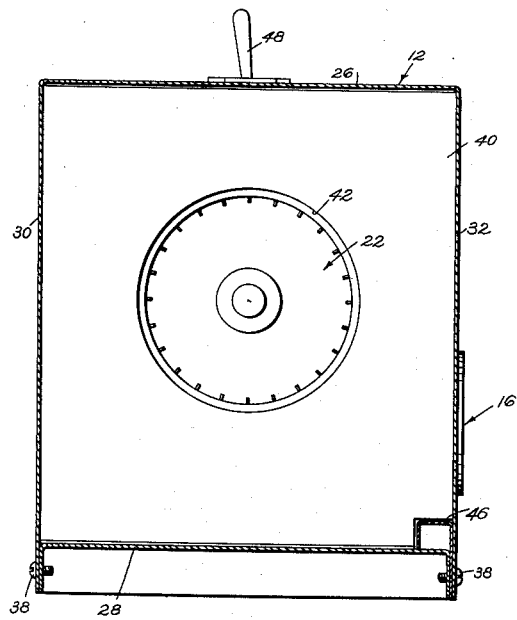
Fig. 3 is a sectional view on the line 3—3 of Fig. 2.

As here shown, casing 10 comprises a top wall 26, a bottom wall or base 28 opposite side walls 30 and 32, and end wall 34 in which said air inlet 14 is provided, and an opposite end wall 36. Bottom wall 28 is preferably channel-shaped as shown, and the other of said parts of the casing are preferably formed in fixed unitary relation providing an enclosure or housing which is secured removably to bottom wall or base 28 in any suitable way as by screws 38. It will be observed that the heater 18 and the pump motor unit 22, 24 are secured to base 28 and that a plate 40 is similarly secured to said base. Said last mentioned plate extends transversely of the air passage of the casing adjacent pump 22 and closes said passage except for the opening 42 through which the air passes to said pump during the operation of the latter. Vertical baffles 44 are secured to said walls 30 and 32 for directing the heated air to that cross sectional area of the casing in which the slides S are positioned so that substantially all of the air which is admitted into the casing through inlet 14 flows over said slides. A conduit 46 is provided in casing 12 on base 28 adjacent side wall 32 for the electric wiring (not shown) leading to heater 18 for energizing the latter under the control of a switch 48 which is also used to start and stop the pump motor 24. As illustrated in Fig. 3, conduit 46 may be formed as a separate piece secured in position by certain of the screws 38 which fasten the casing housing to the bottom wall or base 28.

Figure 5:
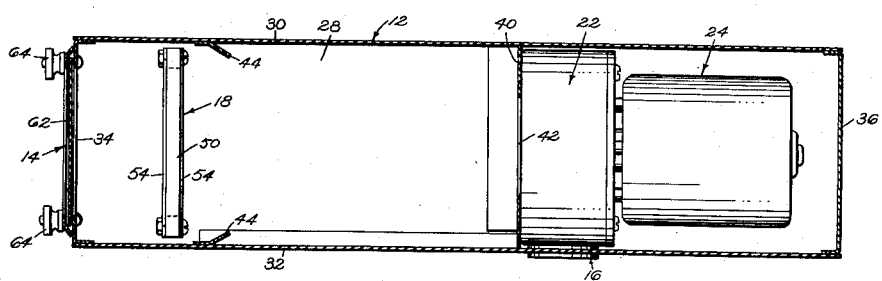
Fig. 5 is a longitudinal sectional view on the line 5—5 of Fig. 2.

Heater 18 comprises an open vertical frame 50 which is fastened to base 28 in any suitable way as by screws 52. Foraminous heating material 54 (Fig. 6) is mounted on frame 50. Said foraminous material is preferably of open mesh woven fabric formation and comprises electrically conductive wire 56 interwoven with non-conducting threads or strands 58. As illustrated in Fig. 2, the material 54 is folded, as indicated at 60, so that layers thereof are disposed at opposite sides of frame 50. It will be noted that as shown by Figs. 2 and 5, heater 18 extends for substantially the full width and depth of casing 12 so that substantially all of the air which is admitted into said casing through inlet 14 flows through said heater and thereby is heated during the passage of said air through the heater material 54.

An air filter 62 is removably secured to end wall 34 of the casing in any suitable way as by nuts 64 at the outer side of inlet 14 for filtering the air admitted to the casing. It will be understood that said air filter may be of any suitable construction and therefore does not require any specific description.

The top wall 26 is provided with an opening 66 for the insertion and removal of the slide holder 20, and a releasable closure 68 is secured to said casing in any suitable way as by a hinge 70 for closing said opening.

As illustrated in Figs. 2 and 4, the casing is provided with means adjacent opening 66 for supporting the slide holder 20. As here shown, said means comprises longitudinally extending angle members 72 which are secured to side walls 30 and 32 below the upper edges of the latter for engagement by the cross strap 74 of the slide holder 20. The upper ends of angle members 72 are inwardly offset from side walls 30 and 32 providing recesses to receive the downturned end portions 76 of strap 74, so as to position the slide holder 20 centrally of the casing 12, widthwise thereof, whereby to register the assemblage of slides S with the heater 18. The slide holder 20 preferably comprises a frame 78 in which helical coil springs 80 are movably secured for receiving and holding the slides S in position depending from the slide holder while the slides are held resiliently between adjacent convolutions of the springs. The slide holder 20 may be of the construction shown in my co-pending application Serial No. 769,897, filed by me August 21, 1947 and now Patent No. 2,522,416. It will be noted that when the slide holder 20 is positioned in the casing, closure 68 completely closes opening 66 on the top as well as at the sides of said opening by reason of the flanges 82 of said closure so that the passage of air into or out of the casing through opening 66 is substantially prevented.

It will be understood that when motor 24 is operated, air is drawn into the casing through inlet 14 by rotary pump 22 and is expelled from the casing by said pump through outlet 16, and that in its passage through the casing the air passes through the foraminous heating material 54 and is heated thereby and flows across the faces of slides S for drying the latter. It will be noted that a multiplicity of slides may be mounted in holder 20 and thereby inserted into the casing, supported in correct position therein during the drying operation, and thereafter removed from the casing without individual handling of the slides, except in placing the slides in the holder 20 and removing them from said holder.

It will be understood that the invention may be embodied otherwise than as herein specifically illustrated or described, and that various changes in the details of construction and in the form and arrangement of parts of the illustrated embodiment may be made without departing from the underlying idea or principles of this invention within the scope of the appended claims.

Having thus described my invention, what I claim and desire to secure by Letters Patent, is:

1. A dryer for microscope slides, comprising a casing having an air passage therethrough and an inlet and outlet for said passage, means for inducing a flow of heated air through said passage for drying the slides, said casing having a top wall provided with an opening extending into said passage located between said inlet and outlet of the latter for the insertion of the slides into said passage transversely thereof and for the removal of the slides therefrom, a holder having a frame provided with means for releasably holding a plurality of slides therein in spaced face to face relation, said holder and the slides mounted therein providing a unitary assembly movable into and out of the casing as a unit with said slides adapted to depend vertically from said frame when the latter is positioned in said casing, and means on said casing for supporting the slide holder in position at said opening and to position the slides carried thereby in said passage with the slides disposed edgewise of the direction of air flow through said passage so that the air flows between the faces of the slides when the holder is mounted on said supporting means of the casing.

2. A dryer for microscope slides, comprising a casing having an air passage therethrough and an inlet and outlet for said passage, means for inducing a flow of heated air through said passage for drying the slides, said casing having an opening into said passage located between said inlet and outlet of the latter for the insertion of the slides into said passage transversely thereof and for the removal of the slides therefrom, a holder having a frame provided with means for releasably holding a plurality of slides therein in spaced face to face relation, said holder and the slides mounted therein providing a unitary assembly movable into and out of the casing as a unit, and means on said casing for supporting the slide holder in position at said opening and to position the slides carried thereby in said passage with the slides disposed edgewise of the direction of air flow through said passage so that the air flows between the faces of the slides when the holder is mounted on said supporting means of the casing, said casing having walls which are provided with said supporting means and having a top wall which is provided with said opening, said frame having lateral portions which rest removably on said supporting means so that the assembly may be inserted into the casing with the slides depending vertically from said frame.

3. A dryer for microscope slides, comprising a casing having an air passage therethrough and an inlet and outlet for said passage, means for inducing a flow of heated air through said passage for drying the slides, said casing having an opening into said passage located between said inlet and outlet of the latter for the insertion of the slides into said passage transversely thereof and for the removal of the slides therefrom, a holder having a frame provided with means for releasably holding a plurality of slides therein in spaced face to face relation, said holder and the slides mounted therein providing a unitary assembly movable into and out of the casing as a unit, said frame having an open side from which the slides extend outwardly of the frame and into said passage when the holder is positioned in the casing, and means on said casing for supporting the slide holder in position at said opening and to position the slides carried thereby in said passage with the slides disposed edgewise of the direction of air flow through said passage so that the air flows between the faces of the slides when the holder is mounted on said supporting means of the casing, said opening being dimensioned complementary to said unitary assembly whereby the latter is movable into and out of said casing as a unit.

4. A dryer for microscope slides, comprising a casing having an air passage therethrough and an inlet and outlet for said passage, means for inducing a flow of heated air through said passage for drying the slides, said casing having an opening into said passage located between said inlet and outlet of the latter for the insertion of the slides into said passage transversely thereof and for the removal of the slides therefrom, a holder having a frame provided with means for releasably holding a plurality of slides therein in spaced face to face relation, said holder and the slides mounted therein providing a unitary assembly movable into and out of the casing as a unit, and means on said casing for supporting the slide holder in position at said opening and to position the slides carried thereby in said passage with the slides disposed edgewise of the direction of air flow through said passage so that the air flows between the faces of the slides when the holder is mounted on said supporting means of the casing, said casing having walls which are provided with said supporting means and having a top wall which is provided with said opening, said frame having lateral portions which rest removably on said supporting means so that the assembly may be inserted into the casing with the slides depending vertically from said frame, said frame having an open side from which the slides extend outwardly of the frame and into said passage when the holder is positioned in the casing.

5. A dryer for microscope slides, comprising a casing having an air passage therethrough and an inlet and outlet for said passage, means for inducing a flow of heated air through said passage for drying the slides, said casing having an opening into said passage located between said inlet and outlet of the latter for the insertion of the slides into said passage transversely thereof and for the removal of the slides therefrom, a holder having a frame provided with means for releasably holding a plurality of slides therein in spaced face to face relation, said holder and the slides mounted therein providing a unitary assembly movable into and out of the casing as a unit, and means on said casing for supporting the slide holder in position at said opening and to position the slides carried thereby in said passage with the slides disposed edgewise of the direction of air flow through said passage so that the air flows between the faces of the slides when the holder is mounted on said supporting means of the casing, said frame having an open side for the insertion and removal of the slides from the holder when the latter is withdrawn from said casing, and said means for releasably holding the slides in said frame comprising spring convolutions which releasably grip end portions of the slides, said convolutions having their axes adapted to extend transversely of said casing whereby said slides are disposed transversely of said casing when said unitary assembly is positioned in said casing.

6. A dryer for microscope slides, comprising a casing having an air passage therethrough and an inlet and outlet for said passage, means for inducing a flow of heated air through said passage for drying the slides, said casing having an opening into said passage located between said inlet and outlet of the latter for the insertion of the slides into said passage transversely thereof and for the removal of the slides therefrom, and means for supporting a slide-holder in position in said casing so that the slide-holder and the slides carried thereby can be inserted into the casing and removed therefrom as a unitary assembly through said opening, said casing having opposed walls provided with parts secured thereto adjacent said opening to provide laterally spaced supports for the slide holder when the latter is inserted in the casing, said casing opening being located in a top wall of the casing between said opposed walls thereof.

EDWIN C. WEISKOPF.

REFERENCES CITED

The following references are of record in the file of this patent:

UNITED STATES PATENTS

| Number | Name | Date |
|---|---|---|
| 1,111,938 | Amundson | Sept. 29, 1914 |
| 1,589,642 | Harris | June 22, 1926 |
| 1,888,947 | Buck | Nov. 22, 1932 |
| 2,168,478 | Hyde et al. | Aug. 8, 1939 |
| 2,257,394 | Niersbach | Sept. 30, 1941 |
| 2,313,786 | Van Daam | Mar. 16, 1943 |
| 2,479,706 | Williams | Aug. 23, 1949 |

OTHER REFERENCES

"The Microscope," by S. H. Gage, 15th edition (1932), page 508.